H. HOPKINS.
SHAFT BALANCING MACHINE.
APPLICATION FILED SEPT. 25, 1916.

1,252,695.

Patented Jan. 8, 1918.
3 SHEETS—SHEET 1.

Witness
Chas. W. Stauffer
Anna M. Dorr

Inventor
Henry Hopkins
By Barthel + Barthel
Attorneys

H. HOPKINS.
SHAFT BALANCING MACHINE.
APPLICATION FILED SEPT. 25, 1916.

1,252,695.

Patented Jan. 8, 1918.
3 SHEETS—SHEET 2.

Witness
Chas. W. Stauffiger
Anna M. Dorr

Inventor
Henry Hopkins
By Barthel & Barthel
Attorneys

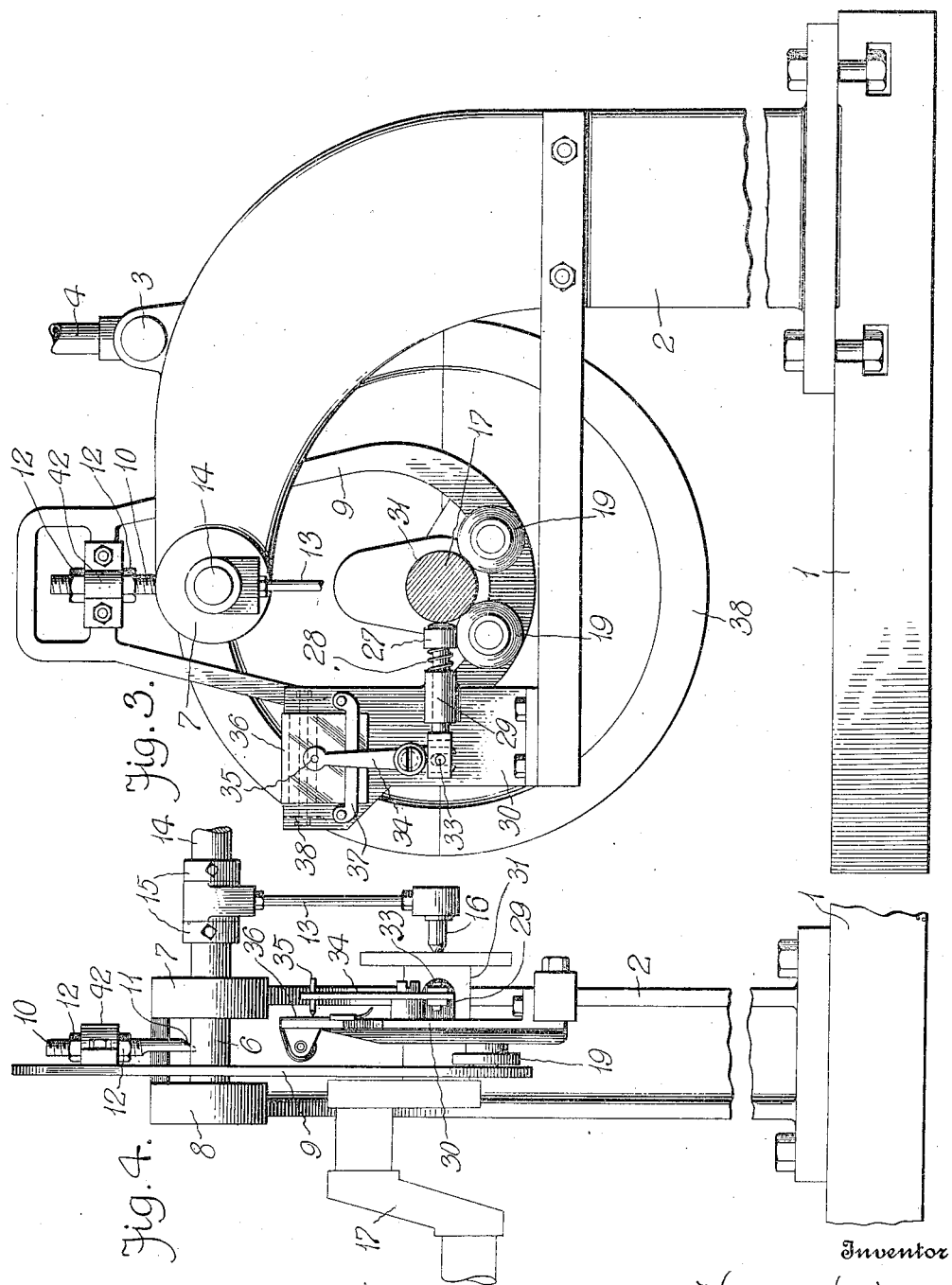

UNITED STATES PATENT OFFICE.

HENRY HOPKINS, OF DETROIT, MICHIGAN, ASSIGNOR, BY MESNE ASSIGNMENTS, TO CONTINENTAL MOTORS CORPORATION, OF DETROIT, MICHIGAN, A CORPORATION OF VIRGINIA.

SHAFT-BALANCING MACHINE.

1,252,695.     Specification of Letters Patent.     Patented Jan. 8, 1918.

Application filed September 25, 1916. Serial No. 122,179.

*To all whom it may concern:*

Be it known that I, HENRY HOPKINS, a citizen of the United States of America, residing at Detroit, in the county of Wayne and State of Michigan, have invented certain new and useful Improvements in Shaft-Balancing Machines, of which the following is a specification, reference being had therein to the accompanying drawings.

In the construction of crank shafts for explosive engines of a high speed type it is desirable that a running balance be obtained to obviate vibrations.

This invention relates to a balancing machine whereby a crank shaft may be brought to dynamic balance and whereby adjustment for obtaining these results may be made and the results thereof accurately noted.

The invention consists in the matters hereinafter set forth and more particularly pointed out in the appended claims.

In the drawings,

Figs. 3 and 4 are views in end elevation of a modification of the device.

Figure 1:
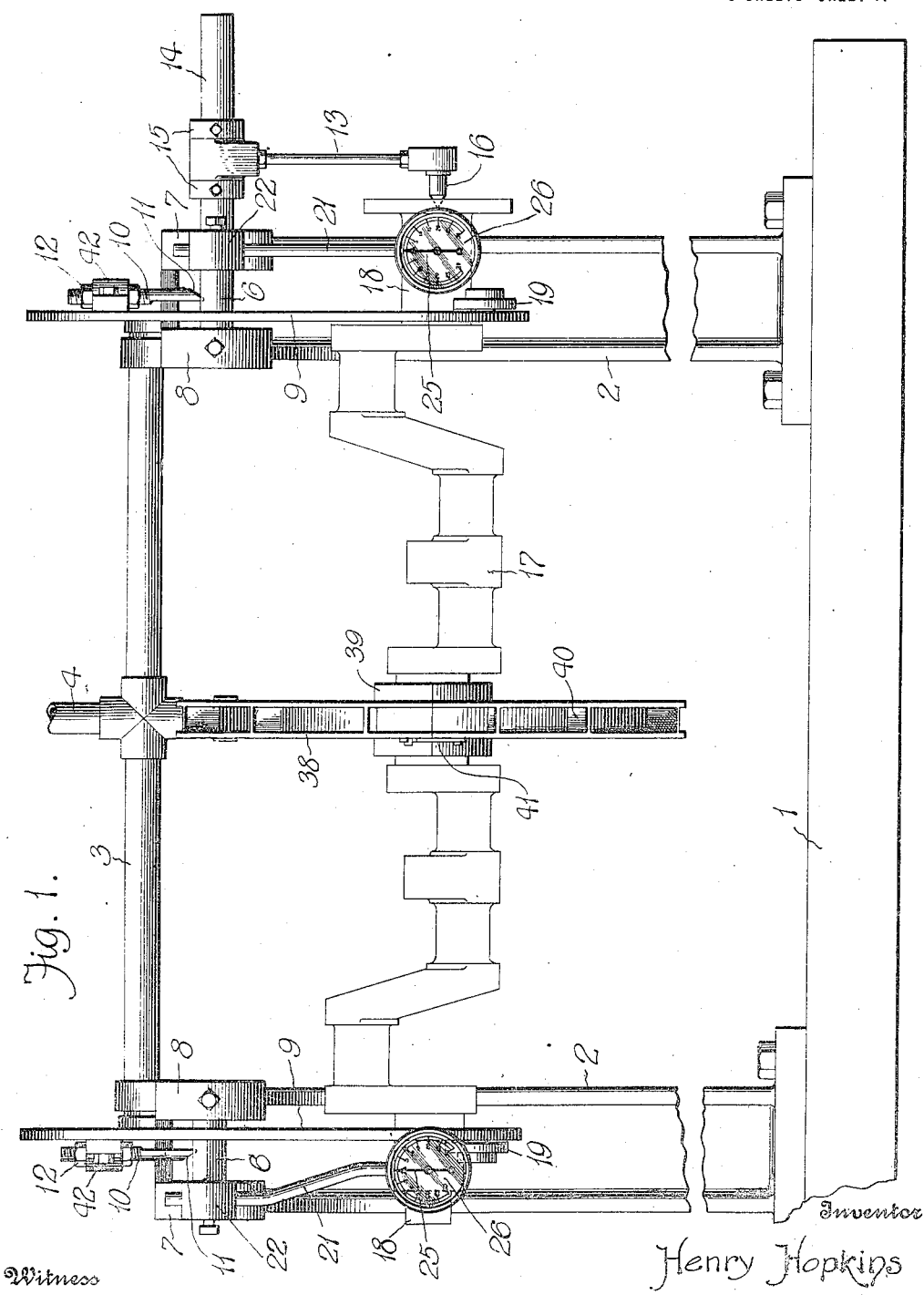
Figure 1 is a view in side elevation of a machine that embodies features of the invention.
Figure 2:
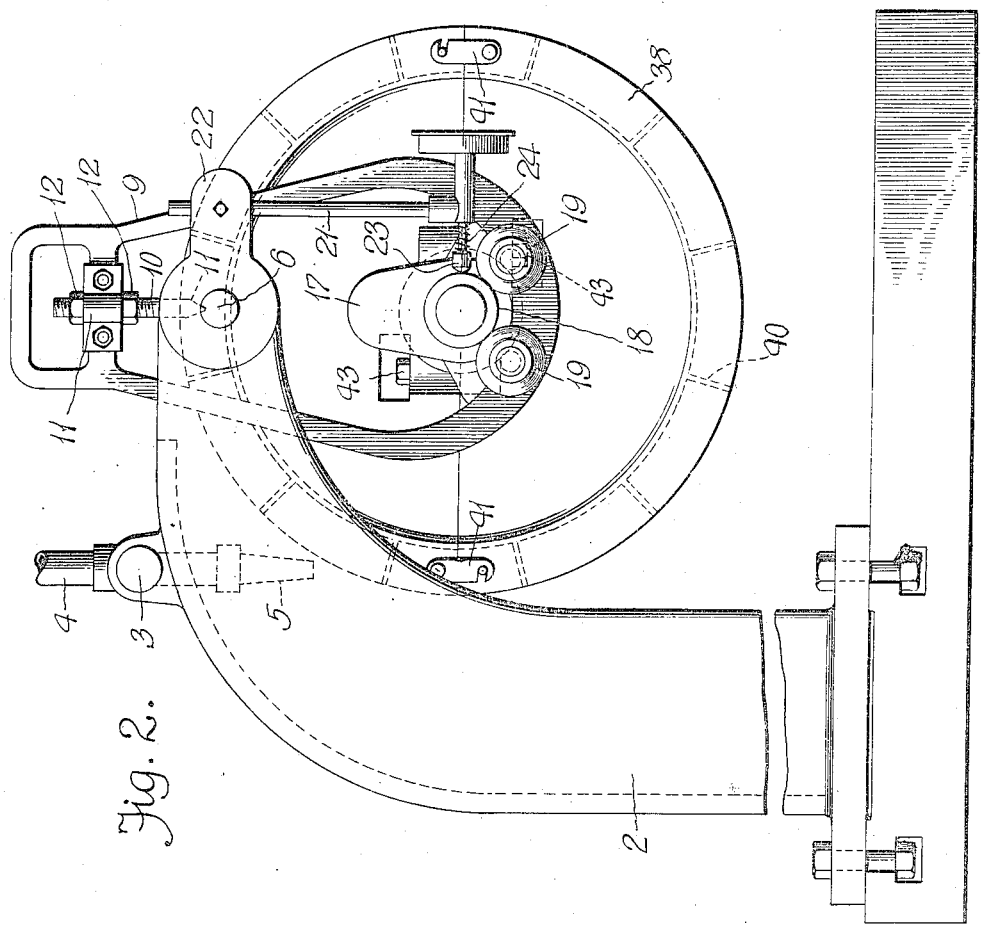
Fig. 2 is a view partially broken away, of the machine in end elevation.

As shown herein in preferred form, a base 1 of suitable type, has a pair of standards 2 that are preferably of the gooseneck type and one at least of which is preferably adjustable on the base to vary the distance between them. These may be connected at their upper portions by a cross member 3 that in this instance is tubular, and, at any rate, affords support for a jet pipe 4 having a suitably disposed jet nozzle 5 whereby a blast of air may be directed as hereinafter described.

A pair of axially alined studs 6 are secured on suitable supporting members 7 and 8 of each gooseneck 2. An open yoke frame 9 is pivotally supported on each stud 6, as by a vertically adjustable spindle 10 having a tapered pivot point 11 entering a depression in the stud 6, the upper portion of the stud being screwthreaded for adjustment through a lug 42 of the yoke, and a jam nut 12 holding the stud in adjusted position. A centering arm 13 swings from an extension 14 of one of the studs 6 between suitable guide collars 15 and is provided with a center point 16 arranged to enter the center depression of a shaft indicated at 17 which it is desired to test, when the journal portions 18 of the shaft lie upon pairs of friction rollers 19 or other suitable bearings on the yokes.

A rod 21 vertically adjustable in an arm 22 of each standard, carries at its lower end an indicating device. This is in the form of a longitudinally reciprocable pin 23 that is yieldingly projected as by a spring 24 against the adjacent journal 18 of the applied shaft 17, any longitudinal movement of the pin being shown by a suitable pointer 25 traversing a dial plate 26, the connection between the member 23 and the pointer being of any preferred form whereby movements of the pointer in either direction from the initial position are at once indicative of a forward or retrograde movement of the member 23. The indicating means is not *per se*, a part of the invention.

Or, as shown in Figs. 3 and 4, the vibration indicating means may consist of a longitudinally reciprocable member 27 one end of which is projected lightly as by a spring 28 through the guide aperture of a lug 29 in a bracket 30, against the journal portion 31 of a shaft mounted in the testing machine. The other end portion of the member 27 has a cross pin 33 engaging the bifurcated end portion of a stylus lever 34. A recording stylus 35 in the upper end portion of the lever 34 traverses a sheet 36 that is shiftable vertically behind a spring bar or clip 37 on the upper plate end 38 of the bracket 30 so that vibration of the member 27 produces transverse markings on the sheet and as fast as tests are completed the sheet may be shifted manually to record new results.

A propeller 38 is adapted to be detachably mounted, as by a split bearing 39 or the like, on the shaft so that an air blast or jet from the nozzle 5 impinges upon the buckets 40 thereof. Preferably the propeller is made in two sections held together by a stud 43 and clamp member or latch 41, for securing it around a shaft to be tested.

As a result of this construction, a shaft that is mounted on the device may be made to rotate at high speed, and the vibrations of each end of the shaft are apparent at once on the indicating devices. Therefore it is easily seen that shafts may be brought to dynamic or running balance, with little difficulty.

The important feature of the device is the fact that the shaft which is out of balance manifests it by horizontal motion to a greater degree than by a motion in a vertical plane and the machine takes advantage of this fact and is therefore very sensitive and is to that extent very efficient in obtaining the desired result.

Obviously, changes in the details of construction may be made without departing from the spirit of my invention and I do not care to limit myself to any particular form or arrangement of parts.

What I claim is:—

1. A balancing machine comprising a pair of swinging yoke frames having anti-friction shaft bearings, means adapted to rotate a shaft resting on said bearings without restraining the movement of the yoke frames upon the bearings of the latter, and means for indicating movement of the yokes in either direction from initial position when the shaft is revolved.

2. A balancing machine comprising a pair of alined pivot bearing studs, yokes each swinging on a stud, shaft bearing members on the yokes below the studs, means adapted to rotate a shaft mounted on the bearings without confining the yokes, and means for indicating movement of each yoke from initial position when an applied shaft is rotated.

3. A balancing machine comprising a pair of upright supporting members, a pair of yokes each pivoted to swing freely from the supporting members, anti-friction bearing members on the yokes for rotatably supporting a crank shaft thereon, means adapted to rotate a shaft on the bearings without confining the yokes, and means for indicating the movement of either yoke from initial position.

4. A balancing machine comprising a pivot support, a pair of yokes swinging in alinement freely therefrom and having anti-friction bearings on the depending portions for supporting a crank shaft thereon, a propeller wheel adapted to be secured detachably to a shaft applied to the bearings, and means for directing an air current against the propeller blades for rotating the shaft.

5. A balancing machine comprising a pivot support, a pair of yokes swinging in alinement freely therefrom and having anti-friction bearings on the depending portions for supporting a crank shaft thereon, a propeller wheel adapted to be secured detachably to a shaft applied to the bearings, means for directing an air current against the propeller blades for rotating the shaft, and means for indicating movement of each yoke from initial position.

6. A balancing machine comprising a pair of supporting members in spaced adjusted relation, a pair of pivot bearing studs secured in substantial alinement on the supports, a pair of yokes each having an upright spindle forming a pivot bearing resting on a companion stud, a pair of anti-friction bearings each mounted on a depending portion of a yoke, indicating means on each support adapted to bear against the shaft and mounted on the bearings for indicating movements of the shaft and yokes from the initial position when such shaft is rotated, and means for revolving a shaft mounted on the bearings.

7. A balancing machine comprising a base, a pair of supporting members in adjustable spaced alined relation thereon, a pair of pivot studs on the supporting members in substantial alinement, a pair of yokes, pivot means supporting each yoke to swing freely on a companion stud, anti-friction bearings on the depending portions of the yoke for rotatably supporting a crank shaft on the yokes, a propeller adapted to be detachably mounted on a shaft supported on the bearings, and means for directing an air blast against the propeller to rotate the latter when applied to such shaft.

8. A balancing machine comprising a base, a pair of supporting members in adjustable spaced alined relation thereon, a pair of pivot studs on the supporting members in substantial alinement, a pair of yokes, pivot means supporting each yoke to swing freely on a companion stud, anti-friction bearings on the depending portions of the yokes for rotatably supporting a crank shaft, a propeller adapted to be secured on a shaft so supported on the bearings, means for directing an air blast against the propeller to rotate the latter when applied to such shaft, and means on each supporting member adapted to contact with a shaft supported on the yoke bearings and to indicate movement of the shaft and adjacent yoke from initial position when the shaft is rotated.

9. A balancing machine comprising a pair of goose neck members supported on a base in spaced adjustable and alined relation, a pair of horizontally disposed pivot bearing studs carried by the goose neck members in substantially axial alinement, a pair of yokes, an upright pivot spindle resting on a bearing stud and permitting the yoke to swing freely in a vertical plane, anti-friction bearing means on each yoke for rotatably supporting a shaft, a centering arm swinging on one of the studs and having a center point for centering a shaft on the bearing of the companion yoke, indicating means on each upright member having a reciprocable member adapted to be yieldingly pressed against a shaft applied to the yoke bearings, whereby movements of a shaft mounted in the yoke bearings and the yoke from initial position are indicated, and means for rotating a shaft mounted on the bearings by an air blast.

10. A balancing machine comprising a base, a pair of upright goose neck supporting members thereon, a pair of bearing studs secured in horizontal axial alinement on the bearing members each provided with a bearing depression, a yoke on each stud, an upright spindle adjustably secured on each yoke and engaged in the bearing depression as a swinging bearing for the yoke, anti-friction bearing members mounted on the depending portions of the yokes for rotatably supporting a shaft thereon, a centering arm swinging on one of the studs and having a center point for locating a shaft on the adjacent yoke bearing, indicating means on each goose neck member having a reciprocable member adapted to be yieldingly held against a shaft mounted on the yoke bearings and arranged to show movements of the shaft and yokes from initial position, a propeller adapted to be secured on a shaft when the latter is mounted in the yoke bearings, and an air blast pipe adapted to direct an air jet against the propeller when the latter is in operative position.

11. A balancing machine comprising means for suspending a shaft rotatably to swing also in a horizontal plane, means adapted to rotate a shaft thus suspended without limiting the movements of the suspending means, and means for indicating displacement of the shaft in either direction in the horizontal plane.

12. A balancing machine comprising means for suspending a shaft to swing in a horizontal plane and to rotate on its axis, means for causing the shaft to rotate without confining the shaft suspending means, and means for indicating movement of the shaft from initial position in either direction in the horizontal plane when the shaft is revolved.

In testimony whereof I affix my signature in the presence of two witnesses.

HENRY HOPKINS.

Witnesses:
 W. H. REDDIG,
 C. A. NEATE.